US007976804B2

(12) United States Patent
Jantsch et al.

(10) Patent No.: US 7,976,804 B2
(45) Date of Patent: Jul. 12, 2011

(54) METHOD FOR THE DECOMPOSITION OF $N_2O$ IN THE OSTWALD PROCESS

(75) Inventors: Uwe Jantsch, Freigericht (DE); Jonathan Lund, Kelkheim (DE); Marek Gorywoda, Hof (DE); Marcus Kraus, Bruchköbel (DE)

(73) Assignee: W.C. Heraeus GmbH, Hanau (DE)

( * ) Notice: Subject to any disclaimer, the term of this patent is extended or adjusted under 35 U.S.C. 154(b) by 0 days.

(21) Appl. No.: 12/351,257

(22) Filed: Jan. 9, 2009

(65) Prior Publication Data
US 2009/0130010 A1 May 21, 2009

Related U.S. Application Data

(62) Division of application No. 11/053,708, filed on Feb. 8, 2005, now abandoned.

(30) Foreign Application Priority Data

Mar. 11, 2004 (DE) .................. 10 2004 012 333
May 13, 2004 (DE) .................. 10 2004 024 026

(51) Int. Cl.
*B01D 50/00* (2006.01)
*B01D 53/34* (2006.01)
*B01D 53/56* (2006.01)
*B01D 53/86* (2006.01)
*B01J 8/00* (2006.01)
*B01J 23/00* (2006.01)
*B01J 21/00* (2006.01)
*B01J 20/00* (2006.01)
*C01B 21/00* (2006.01)

(52) U.S. Cl. .............. 423/239.1; 422/177; 422/180; 502/261; 502/302; 502/303; 502/304; 502/326; 502/327; 502/332; 502/333; 502/339; 502/349; 502/350; 502/355; 502/415; 502/439

(58) Field of Classification Search .............. 423/239.1; 502/261, 302, 303, 304, 326, 327, 332, 333, 502/339, 349, 350, 355, 415, 439; 422/177, 422/180
See application file for complete search history.

(56) References Cited

U.S. PATENT DOCUMENTS

| 3,840,471 | A | | 10/1974 | Acres | |
| 3,914,376 | A | * | 10/1975 | Barker | 423/213.5 |
| 3,951,860 | A | * | 4/1976 | Acres et al. | 502/207 |
| 4,117,082 | A | * | 9/1978 | Matsuyama | 423/247 |
| 4,157,316 | A | | 6/1979 | Thompson et al. | |
| 4,172,047 | A | * | 10/1979 | Gandhi et al. | 502/332 |
| 4,183,829 | A | * | 1/1980 | Adachi et al. | 502/328 |
| 4,233,189 | A | * | 11/1980 | Gandhi et al. | 502/325 |
| 4,316,822 | A | * | 2/1982 | Fujitani et al. | 502/304 |
| 4,367,162 | A | * | 1/1983 | Fujitani et al. | 502/178 |
| 4,440,874 | A | * | 4/1984 | Thompson | 502/327 |
| 4,476,246 | A | * | 10/1984 | Kim et al. | 502/304 |
| 4,536,482 | A | | 8/1985 | Carcia | |
| 4,675,308 | A | * | 6/1987 | Wan et al. | 502/304 |
| 4,678,770 | A | * | 7/1987 | Wan et al. | 502/304 |
| 4,795,733 | A | | 1/1989 | De Thomas | |
| 4,868,149 | A | | 9/1989 | Bricker | |
| 4,904,633 | A | * | 2/1990 | Ohata et al. | 502/304 |
| 4,910,180 | A | * | 3/1990 | Berndt et al. | 502/304 |
| 5,102,851 | A | | 4/1992 | Eri et al. | |
| 5,108,978 | A | * | 4/1992 | Durand et al. | 502/304 |
| 5,116,800 | A | * | 5/1992 | Williamson et al. | 502/303 |
| 5,177,041 | A | | 1/1993 | Horiuchi et al. | |
| 5,439,865 | A | | 8/1995 | Abe et al. | |
| 5,459,119 | A | | 10/1995 | Abe et al. | |
| 5,478,549 | A | | 12/1995 | Koch | |
| 5,591,771 | A | | 1/1997 | Markonius | |
| 5,597,772 | A | * | 1/1997 | McCabe et al. | 502/332 |
| 5,612,009 | A | | 3/1997 | Fetzer et al. | |
| 5,753,580 | A | | 5/1998 | Hayashi et al. | |
| 5,814,576 | A | | 9/1998 | Yamamoto | |
| 5,849,660 | A | | 12/1998 | Takemoto et al. | |
| 5,856,263 | A | * | 1/1999 | Bhasin et al. | 502/333 |
| 5,894,068 | A | * | 4/1999 | Kharas et al. | 502/327 |
| 5,958,826 | A | | 9/1999 | Kurokawa et al. | |
| 6,060,420 | A | | 5/2000 | Munakata et al. | |
| 6,080,375 | A | | 6/2000 | Mussmann et al. | |
| 6,087,295 | A | * | 7/2000 | Kharas et al. | 502/300 |
| 6,147,027 | A | * | 11/2000 | Miyake et al. | 502/325 |
| 6,165,429 | A | * | 12/2000 | Ikeda et al. | 423/213.5 |
| 6,165,623 | A | | 12/2000 | Fife et al. | |
| 6,187,709 | B1 | * | 2/2001 | McCabe | 502/52 |
| 6,221,804 | B1 | * | 4/2001 | Yamada et al. | 502/326 |
| 6,261,989 | B1 | * | 7/2001 | Tanaka et al. | 502/217 |
| 6,294,140 | B1 | * | 9/2001 | Mussmann et al. | 423/213.5 |

(Continued)

FOREIGN PATENT DOCUMENTS

DE 35 43 640 6/1987

(Continued)

OTHER PUBLICATIONS

Applied Catalysis B: Environmental 44 (2003) pp. 117-151.

*Primary Examiner* — Cam N. Nguyen
(74) *Attorney, Agent, or Firm* — Norris McLaughlin & Marcus PA

(57) ABSTRACT

A catalyst for the decomposition of $N_2O$ under the conditions of the Ostwald process, comprising a carrier and a coating made of rhodium, rhodium/palladium or rhodium oxide applied thereto, ensures to yield NO with a particularly low content of laughing gas as the first process product.

7 Claims, No Drawings

U.S. PATENT DOCUMENTS

| | | | |
|---|---|---|---|
| 6,306,794 B1 | 10/2001 | Suzuki et al. | |
| 6,348,430 B1 | 2/2002 | Lindner et al. | |
| 6,375,704 B1 | 4/2002 | Habecker et al. | |
| 6,376,423 B2 | 4/2002 | Yagi et al. | |
| 6,379,640 B1 | 4/2002 | Ver Nooy | |
| 6,395,675 B1 | 5/2002 | Suga et al. | |
| 6,413,483 B1* | 7/2002 | Brisley et al. | 423/239.1 |
| 6,537,511 B1* | 3/2003 | Chattha et al. | 423/213.5 |
| 6,610,628 B2 | 8/2003 | Nordquist et al. | |
| 6,623,716 B2* | 9/2003 | Suga et al. | 423/239.1 |
| 6,649,134 B2* | 11/2003 | Gorywoda et al. | 423/239.1 |
| 6,692,712 B1 | 2/2004 | Andersen | |
| 6,702,960 B1 | 3/2004 | Schaddenhorst et al. | |
| 6,723,295 B1* | 4/2004 | Baier et al. | 423/239.1 |
| 6,743,404 B1 | 6/2004 | Schumacher et al. | |
| 6,761,755 B2 | 7/2004 | Jantsch et al. | |
| 6,764,665 B2 | 7/2004 | Deeba et al. | |
| 6,797,668 B2* | 9/2004 | Yoshikawa | 502/304 |
| 6,827,917 B1 | 12/2004 | Ward et al. | |
| 6,858,193 B2* | 2/2005 | Ruwisch et al. | 423/213.5 |
| 6,864,214 B2* | 3/2005 | Uenishi et al. | 502/304 |
| 6,875,408 B1 | 4/2005 | Yamamoto et al. | |
| 6,887,443 B2* | 5/2005 | Suga et al. | 423/239.1 |
| 6,946,107 B2* | 9/2005 | Carlborg et al. | 423/239.1 |
| 6,967,186 B2 | 11/2005 | Takaya et al. | |
| 7,011,801 B2* | 3/2006 | Van Den Brink et al. | 423/239.2 |
| 7,041,263 B2* | 5/2006 | Sung | 423/239.1 |
| 2002/0172642 A1 | 11/2002 | Dindi et al. | |
| 2003/0103886 A1 | 6/2003 | Dou | |
| 2003/0124046 A1 | 7/2003 | Gorywoda et al. | |
| 2003/0162656 A1 | 8/2003 | Wu et al. | |
| 2003/0181324 A1 | 9/2003 | Hotta et al. | |
| 2004/0023796 A1 | 2/2004 | Nirisen et al. | |
| 2004/0102315 A1 | 5/2004 | Bailie et al. | |
| 2004/0228785 A1* | 11/2004 | Duclos et al. | 423/239.1 |
| 2004/0235651 A1 | 11/2004 | Uenishi et al. | |
| 2005/0096215 A1 | 5/2005 | Espinoza et al. | |
| 2005/0255993 A1 | 11/2005 | Tanaka et al. | |
| 2006/0008401 A1* | 1/2006 | Hotta et al. | 423/239.1 |

FOREIGN PATENT DOCUMENTS

| | | |
|---|---|---|
| DE | 40 20 914 | 1/1992 |
| DE | 41 28 629 | 3/1993 |
| DE | 195 43 102 | 11/1996 |
| DE | 198 19 882 | 10/1999 |
| DE | 100 16 276 | 10/2001 |
| DE | 10 2004 024 026 | 9/2005 |
| EP | 0 946 290 | 10/2001 |
| EP | 1 076 634 | 6/2002 |
| JP | 55-031463 | 3/1980 |
| JP | 06-142509 | 5/1994 |
| JP | 06-142517 | 5/1994 |
| JP | 06-182203 | 7/1994 |
| JP | 2002-253967 | 9/2002 |
| WO | WO 99/64139 | 12/1999 |
| WO | WO 00/51715 | 9/2000 |
| WO | WO 2004/003949 | 1/2004 |
| WO | WO2004003949 | 1/2004 |
| WO | WO 2004/096702 | 11/2004 |

* cited by examiner

METHOD FOR THE DECOMPOSITION OF N₂O IN THE OSTWALD PROCESS

This application is a division of application Ser. No. 11/053,708 filed Feb. 8, 2005, now abandoned.

The subject of the invention is a catalyst for the decomposition of $N_2O$ that results as a by product from the catalytic oxidation of ammonia according to the Ostwald process.

BACKGROUND OF THE INVENTION

The catalytic oxidation of ammonia for the production of nitric acid is known (as Ostwald process). The oxidation of ammonia for large-size production of NO as the first product of the process is achieved on, for example, PtRh or PtRhPd alloy catalysts at a high temperature (usually 800 to 950° C.). Said alloy catalysts are piled up in the reactor in several layers one upon the other, usually in the form of knitted or woven gauzes. Typically, PtRh or PtRhPd wire which is, for example, 76 µm in diameter is used for producing said gauzes.

Since the oxidation of ammonia causes noble metal to be lost via the gas phase in the form of oxide, a system of recovery gauzes is usually arranged underneath the catalyst gauzes, said recovery gauzes being used to collect a part of the platinum. In a replacement reaction with the platinum, it is instead the lighter-weight and lower-priced palladium that passes over to the gas phase.

During the production of nitric acid, the NO that is initially developing at the catalyst gauzes is oxidized to the higher-valency $NO_2$. After having been cooled down, the gas flow is directed to absorption towers, and the nitrogen monoxides are absorbed in water. The conversion to nitric acid is then achieved with additional oxygen.

Nitrogen and $N_2O$ result as by-products from the ammonia oxidation. In contrast to NO and $NO_2$, $N_2O$ does not enter into any further reactions and, after having run through all process stages, is released into the atmosphere. When conventional catalyst gauzes and recovery gauzes are used, an amount of $N_2O$ ranging from 500 to 3000 ppm is released into the environment, unless the $N_2O$ is removed subsequently (EP 1 076 634 B1).

Some time ago, $N_2O$ was classified as a climatically harmful gas, since it both affects the ozone layer adversely and contributes to global heating. Since its potential for global heating exceeds that of $CO_2$ by a factor of about 310, relatively low emissions of $N_2O$ are sufficient to contribute to global heating to a considerable degree. For that reason, efforts are made to reduce anthropogenic $N_2O$ emissions.

In other words, the content of $N_2O$ in the product gas of ammonia oxidation should be reduced. This can be achieved either by reducing the formation of $N_2O$ or by degrading it.

A number of catalysts have already been proposed for the decomposition of laughing gas. Applications and requirements vary depending on whether exhaust gas is purified, laughing gas from excessive anesthetic gas is destroyed, or ammonia is removed from industrial waste gases. The carrier material also has an influencing effect. For example, rhodium (oxide) on gamma-$Al_2O_3$ does not result in any reduction of $N_2O$ in the Ostwald process. On the other hand, gamma-$Al_2O_3$ is, for the most part and to advantage, used in the case of catalytic converters.

Systems with Pt, Rh, Ru and/or Ir have, for example, already been disclosed for catalytic converters. For example, JP 06142509 recommends a percentage by weight of Rh ranging from 0.3 to 2 on alpha-$Al_2O_3$ for temperatures ranging from 300 to 500° C. for the removal of $N_2O$, Said document also mentions Ru and Ir as catalysts. These metals, in turn, do not have any effect in the Ostwald process.

JP 6142517 A1 describes catalysts with alpha-$Al_2O_3$ as carrier material, which comprise Rh or Ru and at least one of the oxides of Ti, Zr or Nb. The fact that Ru is not suited for the Ostwald process applies here as well. Furthermore, titanium and niobium oxides are not suitable either.

According to JP 2002253967 A1, Ru or Pd on $SiO_2$ or $Al_2O_3$ are also used to destroy laughing gas that is excessive as anesthetic gas. Appropriate reactors are steel pipes which are packed with $Al_2O_3$ grains that are coated with noble metal and are operated at 150 to 550° C. (JP 55031463 A1). Here as well, the requirements are different in that both Ru and Pd do not have any effect in the Ostwald process and $SiO_2$ is chemically unstable under the conditions of the Ostwald process. JP 06182203 relates to fluoride-containing carriers for noble-metal catalysts.

According to DE 40 20 914 A1, ammonia undergoes combustion almost without any formation of laughing gas if it is brought into contact with Pt, Pd, Rh or Ir, in combination with at least one of the oxides of Mo, V. The process described is, however, not used for large-size $NH_3$ combustion, but for removing low concentrations of $NH_3$ from waste gases.

According to DE 35 43 640, pure laughing gas at Pd can be decomposed properly, for example on corundum, alumina or silicic acid. However, palladium is completely inactive in case of a reduction of $N_2O$ in the Ostwald process.

For example, the following systems have become known specifically for use with the Ostwald process:

DE 198 19 882 A1 describes a catalyst for the decomposition of $N_2O$, said catalyst being arranged downstream of the gauze catalyst and upstream of the heat exchanger and being provided as fixed-bed catalyst. In particular, it is a combination of $CuO-Al_2O_3$ with tin or lead.

DE 41 28 629 A1 discloses a silver catalyst with $Al_2O_3$ as carrier material.

DE 100 16 276 proposes CuO-containing catalysts. For example, a catalyst on CuO—$Al_2O_3$ base was tested within an industrial scope. The reduction of $N_2O$ achieved in a plant operated atmospheric pressure was 80 to 90% and that achieved in a medium-pressure plant (5.5 bar) at Antwerp was approx. 70% (G. Kuhn: Proceedings of the Krupp Uhde Technologies Users Group Meeting 2000, Vienna, 12-16 Mar. 2000). NO losses were specified to be <0.5%. The fact that copper might be dissolved out of the catalyst is pointed out in (Applied Catalysis B: Environmental 44 (2003) S.117-151). Since the decomposition of ammonium nitrate is catalysed by copper, this would be a serious safety problem.

According to US 2004023796, a catalyst for the decomposition of $N_2O$ at 250 to 1000° C. was developed on the base of Co-oxide spinels on a $CeO_2$ carrier ($CO_3$-$xMxO_4$, wherein M Fe or Al and x are 0 to 2). NO losses were specified to be <0.2%. Similar cobalt-oxide-containing systems have already been recommended for the oxidation of ammonia (EP0946290B1).

U.S. Pat. No. 5,478,549 describes the utilization of $ZrO_2$ as $N_2O$ decomposition catalyst. This teaching is further developed in WO 0051715 in that iron and, optionally, transitional metals can be admixed to the $ZrO_2$ pellets during their production.

A mixed-oxide catalyst ($ZrO_2$ and $Al_2O_3$) is the subject of WO 9964139. The catalyst which is impregnated with a zirconium salt is intended to partially convert $N_2O$ (approx. 15%) to NO. Altogether, the $N_2O$ is to be degraded by 78 to 99%. However, this requires that the catalyst be provided in very big amounts and, as a rule, that the converter be modified.

Most of these catalysts have deficiencies which may be related with technical safety—as with the above-mentioned catalyst on CuO—$Al_2O_3$ base—or these catalysts fail to be adequately stable under the conditions prevailing in the reactor. This applies both to the catalytically active component and the supporting structure which may, at the same time, have a stabilizing function as compared with the catalytically active component.

Moreover, there is a need of catalyst systems which efficiently remove $N_2O$ under the conditions of the Ostwald process.

Therein, the catalysts should meet the following requirements:

The decomposition of NO must not be catalysed because this would reduce the efficiency of the process.

If it is a fixed-bed catalyst, the catalyst concerned must have a very high activity and may cause only an extremely low pressure drop across the height of the catalyst bed. An increased loss of pressure may also cause a loss of efficiency during the production of $HNO_3$, in particular if the existing technical plant does not allow any further increase in pressure.

The catalyst should not require redimensioning of the existing converters.

SUMMARY OF THE INVENTION

According to the invention, a catalyst is provided that comprises rhodium or rhodium oxide in connection with an appropriate carrier material, said catalyst leading to a surprisingly complete destruction of laughing gas and being particularly suitable for what is called FTC gauzes (cf. DE 195 43 102 C1; these systems use a multi-layer system without separate gauzes for recovery (catchment traps)). The catalyst is, in particular, preferably provided as a fixed-bed catalyst.

As demanded above, such a catalyst must not reduce NO which is the first main product of the Ostwald process. Ceramic materials, such as alpha-$Al_2O_3$, which is already used as a mechanical carrier material for gauze catalysts, as well as the oxides $ZrO_2$ or $CeO_2$ that are recommended in U.S. Pat. No. 5,478,549 are considered to be chemically stable under the special reaction conditions. Hence, these materials can be used to advantage as catalyst carriers for the catalyst according to the invention.

DETAILED DESCRIPTION

The role of rhodium in regard of the $N_2O$ problem is assessed rather negatively in the state-of-the-art. As studies conducted by Messrs. OMG have shown, rhodium in an alloy with platinum rather causes an intensified formation of $N_2O$ (Nitrogen & Methanol, No. 265, September/October 2003, pp. 45-47).

Surprisingly, however, the studies showed that it is the decomposition of $N_2O$ where rhodium or rhodium oxide has a high catalytic effect, provided alpha-$Al_2O_3$ and/or $ZrO_2$ is used as carrier material. Furthermore, the studies showed that mixed palladium-rhodium catalysts can be very efficiently used for the decomposition of $N_2O$ in the Ostwald process, although pure palladium or mixed palladium-nickel catalysts do not reduce $N_2O$ at all (US 2003/0124046 A1).

Preferably, the $N_2O$ that is developing in a secondary reaction at the catalyst gauzes during the oxidation of ammonia is degraded with a downstream catalyst, wherein the gas flows through the downstream catalyst bed. Herein, the catalyst can be arranged directly downstream of the catalyst gauzes or, in case gauzes are used to recover platinum ("catchment traps"), down-stream of these recovery gauzes, as described in U.S. Pat. No. 5,478,549.

The operating temperature required for the $N_2O$ decomposition catalyst is determined by the operating temperature of the ammonia oxidation. This temperature is not below 750° C. and not above 1000° C. and, in case of known reactor types, ranges from 800 to 950° C. Depending on the type of plant, the reactors are operated at a pressure ranging from 1 to 15 bar. Hence, the requirements the catalyst material has to meet under the conditions of the catalytic reaction for the decomposition of $N_2O$ are very high. If its chemical stability is insufficient, the catalyst, if leaching out for a prolonged time interval, can, for example, cause an accumulation of catalyst components in the final product (e.g. fertilizer). This may have a negative effect on the safe handling of said final product (danger of explosion by a lower spontaneous-ignition temperature).

Known catalysts meet these requirements only in part.

It is to particular advantage if the catalyst according to the invention is used in conjunction with what is called FTC systems (DE 195 43 102 C1). The utilization of special alloys and micro-structures allows to reduce the amounts of expensive noble metals that is used to a very high extent, without reducing the conversion efficiency and service life of the catalyst. This alone has already produced distinctly lower $N_2O$ values in the product gas of ammonia oxidation than standard catalyst/catchment gauze systems. In combination with the $N_2O$ decomposition catalyst according to the invention, the $N_2O$ values can be reduced even further. Herein, use is also made of the cost efficiency of the FTC systems which contain less expensive noble metal. Rhodium or rhodium oxide with alpha-$Al_2O_3$ or $ZrO_2$ as carrier material has shown to be an excellent catalyst. If combined with palladium, it is also to advantage: if used as $N_2O$ catalyst, palladium-rhodium on alpha-$Al_2O_3$ results in a distinct reduction of $N_2O$ in the Ostwald process. Under the reaction conditions prevailing in the reactor downstream of the gauzes, rhodium will always oxidize to form rhodium oxide, with the result that rhodium oxide is the catalytically acting component.

As studies under real process conditions have shown, alpha-$Al_2O_3$ and $ZrO_2$ carrier materials, if coated with rhodium or rhodium oxide, maintain their catalytic activity over a long time as well. It is also possible to use carrier materials which contain both oxides or to use $CeO_2$, either alone or together with the substances or combinations mentioned.

As opposed to that, rhodium, if it is used on gamma-$Al_2O_3$ as carrier material and arranged downstream of the catalyst gauzes, is entirely inappropriate for reducing $N_2O$. Rhodium or rhodium oxide on $TiO_2$ has likewise shown to be incapable of reducing $N_2O$ under the special conditions of the Ostwald process.

The catalytic activity of rhodium or rhodium oxide on alpha-$Al_2O_3$ or $ZrO_2$ is so high that a bed height of 3 cm of catalyst pellets suffices to reduce the $N_2O$ content in a medium-pressure plant to less than 200 ppm.

If conventional Raschig rings are used in the stead of pellets and if said Raschig rings are, for example, coated with a rhodium/oxide ceramic wash coat, the pressure loss via the catalyst system remains the same. However, this requires that the wash coat be tempered at a high temperature, i.e. >900° C., before it is coated with Rh, in order to obtain stable oxides. This procedure is hardly suitable for catalytic converters. But the catalytic activity achieved for the Ostwald process is surprisingly high with the pressure loss, at the same time, being extremely low. This process can also be utilized with other carrier materials of various geometric shapes.

It is also possible to use other known carrier materials, such as ceramic foams or honeycomb structures. Furthermore, Kanthal or megapyr screens that are often used as separator screens between the catchment gauzes can be coated with rhodium or a Rh/ZrO$_2$ wash coat. Both the separator screens and any additional screens arranged underneath the catchment gauzes can be coated with rhodium or a rhodium/wash coat to distinctly reduce the N$_2$O values.

The material according to the invention is to particular advantage if it is used together with an FTC system. The separator screens that are arranged between the various FTC gauzes can then be additionally provided with the catalyst to markedly reduce the amount of N$_2$O.

In a variant of the production process for the catalyst according to the invention, densely burned Raschig rings (or Kanthal screens) are coated with a gamma-Al$_2$O$_3$ wash coat; then said wash coat is tempered at a high temperature (950° C.) in order to achieve alpha-Al$_2$O$_3$; finally, it is coated with Rh or Pd—Rh or RhxOy. It is also possible to use a mixture of ZrO$_2$ and gamma-Al$_2$O$_3$ instead of gamma-Al$_2$O$_3$—with the same treatment as described above. Without this treatment, the catalytic activity is distinctly lower.

The material obtained is suitable for a fixed-bed catalyst according to the invention.

Example 1

A gamma-Al$_2$O$_3$ wash coat is, in known manner, applied onto Raschig rings or Kanthal screens, dried and tempered at 950° C. until complete conversion into alpha-Al$_2$O$_3$ is achieved. Coating with Rh or Rh$_2$O$_3$ and/or PdRh is also implemented according to known methods.

Example 2

Zircon oxide extrudates, which are 4 mm to 6 mm in length and approx. 3.5 mm in diameter, and alpha-Al$_2$O$_3$ pearls (approx. 5 mm in diameter) were coated with Rh, Rh$_2$O$_3$ or PdRh and Pd according to known methods.

Example 3

Comparison

Titanium oxide and gamma-Al$_2$O$_3$ pearls, 3 mm to 5 mm in diameter, were coated with Rh or PdRh according to known methods.

The catalysts mentioned in example 1 and example 2 were tested under the conditions of the Ostwald process. The catalysts were arranged underneath the gauzes provided for oxidation of the ammonia. A conventional catalyst system with recovery gauzes was used as reference system. The operating conditions were as follows: temperature=880° C.; pressure=5 bar abs.; ammonia charging=14.5 t NH$_3$/m$^2$/day; ammonia concentration=10.6 w/w percent in the air-ammonia mixture. Test Results:

| Catalyst | Ammonia conversion [%] | N$_2$O reduction as compared with conventional gauzes [%] | Height of catalyst bed [mm] | |
|---|---|---|---|---|
| 0.6% Rh/ZrO$_2$ | 96 | 82 | 30 | Example 2 |
| 0.6% Rh/alpha-Al$_2$O$_3$ | 96 | 70 | 22 | " |
| 0.3% Rh/alpha-Al$_2$O$_3$ | 96 | 72 | 30 | " |
| 0.6% Pd/ZrO$_2$ | 96 | 0 | 22 | " |
| 0.6% PdRh/ZrO$_2$ | 96 | 84 | 30 | " |
| Rh$_2$O$_3$/wash coat on Raschig rings | 96 | 80 | 100 | Example 1 |
| 0.6% Rh/gamma-Al$_2$O$_3$ | 95 | 0 | 22 | Example 3 |
| 0.6% Rh/TiO$_2$ | 96 | 0 | 22 | " |

We claim:

1. A method for the decomposition of N$_2$O under the conditions in which it is formed in the Ostwald process, which comprises contacting said N$_2$O with a catalyst comprising
   A) a carrier material selected from the group consisting of alpha-Al$_2$O$_3$, ZrO$_2$ and CeO$_2$, and
   B) a coating made of a Pd-Rh alloy wherein the content of Pd in the Pd-Rh alloy is >0 to 95%.

2. Method according to claim 1, wherein the decomposition takes place at 750 to 1000° C. and at 0.9 to 15 bar.

3. Method according to claim 1, wherein the content of Pd in the Pd-Rh alloy is 30 to 70%.

4. Method according to claim 1, wherein said catalyst is a fixed-bed catalyst.

5. Method according to claim 1, wherein said catalyst is in the form of pellets, Raschig rings, foam or honeycomb structures.

6. Method according to claim 1, wherein the carrier is alpha-Al$_2$O$_3$.

7. Apparatus for the decomposition of N$_2$O formed in the Ostwald process, comprising at least one catalyst comprising
   A) a carrier material selected from the group consisting of alpha-Al$_2$O$_3$, ZrO$_2$ and CeO$_2$, and
   B) a coating made of a Pd-Rh alloy wherein the content of Pd in the Pd-Rh alloy is >0 to 95% disposed downstream of the catalyst gauzes used to achieve NH$_3$ oxidation in said process.

* * * * *